Jan. 13, 1953      H. W. HEIN      2,625,133
MILK RELEASER

Filed Oct. 28, 1950      2 SHEETS—SHEET 1

Inventor:
Harold W. Hein
By: Paul O. Pippel
Attorney

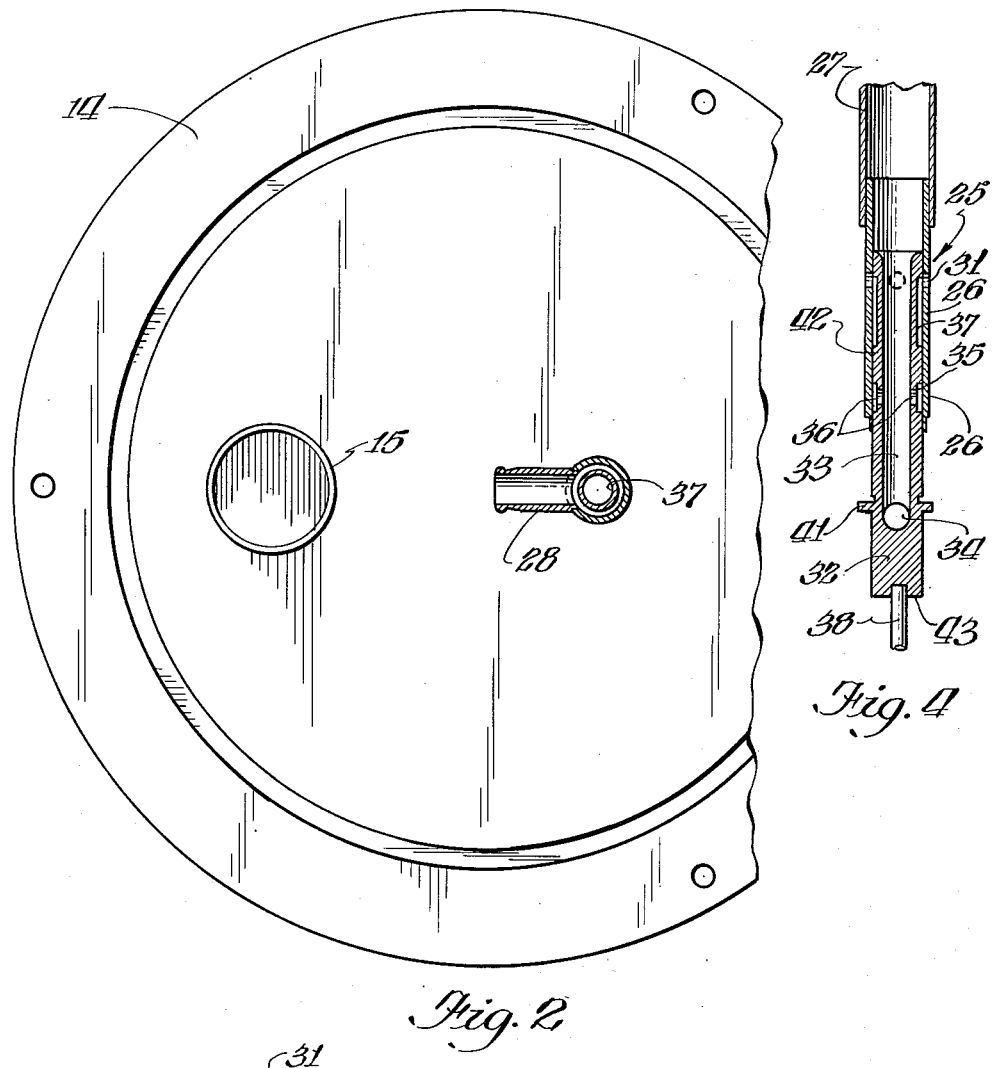

Patented Jan. 13, 1953

2,625,133

UNITED STATES PATENT OFFICE 2,625,133

MILK RELEASER

Harold W. Hein, Chicago, Ill., assignor to International Harvester Company, a corporation of New Jersey Application October 28, 1950, Serial No. 192,769

5 Claims. (Cl. 119—14.07)

This invention relates to a milk releaser. More particularly the invention relates to a milk releaser especially adapted for releasing milk under vacuum from a pipe line milking system.

It is a prime object of this invention to provide a milk releaser for releasing milk from a pipe line system, the releaser having an improved mechanism for alternately equalizing the pressure within a milk receiving chamber and a discharge chamber. A still further object is to provide a gravity type of milk releaser, the releaser including a float responsive to the rise of liquid level within the releaser for controlling the release of milk.

Milk releasers in general consist of a receiving chamber and a discharge chamber. The receiving chamber is in constant communication with a source of vacuum and milk from the pipe line continually flows into the receiving chamber. The function of milk releasers is to release the milk from the vacuum within the pipe line system without materially disturbing the vacuum pressure of the system. The discharge chamber is usually positioned beneath the receiving chamber and is adapted to communicate therewith by means of a discharge outlet during a minus pressure within the receiving chamber. A valve is normally seated over the discharge outlet to seal the same. The valve is pressed over the outlet in sealing relation due to the pressure differential between the discharge chamber and the receiving chamber.

Applicant's improvement consists of a novel vacuum regulating arrangement which is adapted to alternately provide vacuum and atmosphere pressure within the discharge chamber, the discharge of the milk being controlled in response to the liquid level within the receiving chamber. The regulating means is connected by a conduit to the discharge chamber. A slide valve is adapted to alternately place the conduit and the second chamber under vacuum and atmosphere. The slide valve is moved by means of a float which rises and falls with the liquid level within the receiving chamber. Further objects will become apparent upon examination of the following description when taken in connection with the drawings.

In the drawings:

Fig. 2 is a sectional view taken along the line 2—2 of view 1.

Fig. 3 is a sectional view through a vacuum regulating means, the view being taken substantially along the line 3—3 of Fig. 1.

Fig. 4 is a sectional view through a vacuum regulating means, the view being taken substantially along the line 4—4 of Fig. 1.

Figure 1:
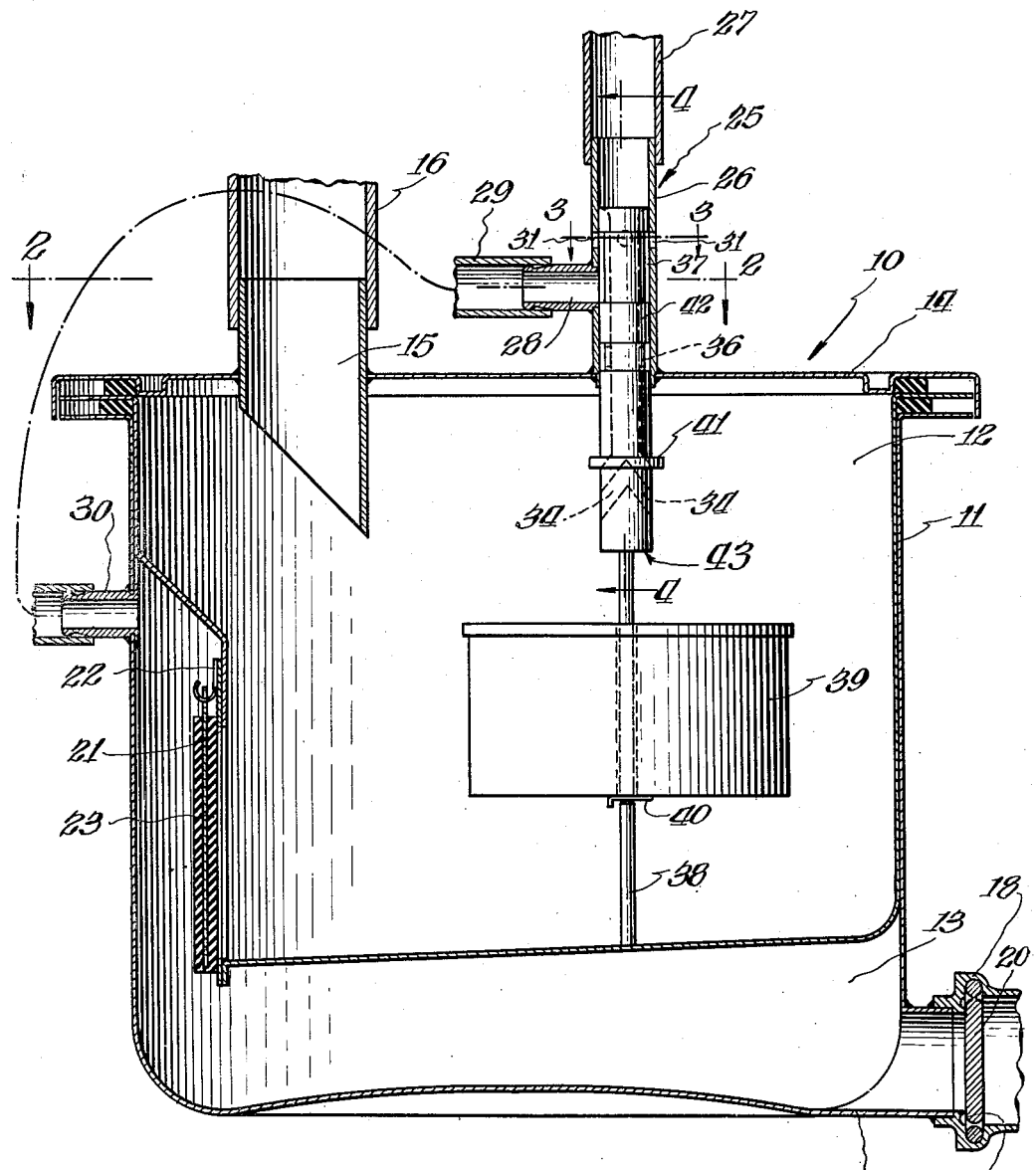
Fig. 1 is a sectional view, in elevation, taken on a vertical central plane through a milk releaser and a regulating valve structure therefor.

A milk releaser is generally designated by the reference character 10. The releaser 10 consists of a container 11 having an upper receiving chamber 12 and a lower discharge chamber 13. The first chamber 12 is also referred to as an "upper receiving chamber 12," and the second chamber is also referred to as a "lower discharge chamber 13." The upper chamber 12 is suitably sealed by means of a cover 14 which is provided with a milk inlet tube or connection 15 communicating with the interior of the upper chamber 12. The milk inlet tube 15 is adapted to connect to a conduit 16 of a pipe line milking system (not shown). The lower discharge chamber 13 is provided at its lower end with a discharge or milk outlet connection 17 which is in communication with a nipple 18 of a pipe line milking system. The nipple 18 is provided with a valve seat 19 which may be engaged by means of a flexible flap valve 20.

The chamber 12 is adapted to communicate with the chamber 13 through a milk discharge outlet or opening 21, a hook 22 is disposed adjacent the outlet 21 within the chamber 13, and a rubber flap valve 23 is hingedly connected to the hook 22. The flap valve 23 normally is positioned over the outlet 21 as shown in Fig. 1.

A valve or regulating structure is generally designated by the reference character 25. The valve or regulating structure 25 includes an upright sleeve or tubular valve member 26 which is supported on the cover 14. The sleeve or tubular valve member 26 is open at its lower end to communicate with the chamber 12 and is open at its upper end to communicate with a vacuum hose connection 27 adapted to connect to a source of vacuum not shown. A vacuum connection in the form of a nipple 28 is connected to the sleeve 26 and communicates with the interior of said sleeve. The nipple 28 is connected by means of a hose 29 to a nipple 30 in communication with the interior of the chamber 13. As best shown in Fig. 3 the sleeve 26 is provided with openings 31 continually in communication with the atmosphere.

Referring now particularly to Fig. 4 it can be seen that the sleeve or tubular valve member 26 is provided with a slide valve or valve member 32 adapted to reciprocate within said sleeve. The slide valve or valve member 32 is provided with an elongated or longitudinally extending bore 33 which has at its lower ends diverging outlets 34 which communicate with the chamber 12. The bore 33 is open at its upper end and therefore is in communication with the upper end of the sleeve 26 and the vacuum hose 27.

The slide valve or valve member 32 is cylindrical in shape and is provided with an annular under cut portion forming with the inner surface of the sleeve 26 an annular communication passage 35. The slide valve is provided with laterally extending vacuum openings or bores 36 in continual communication with the longitudinal bore 33 and the communicating passage 35. Spaced vertically above the communicating passage 35 is an annular passage 37 formed by an undercut portion on the slide valve 32 and the inner surface of the sleeve 26.

A vertical stem 38 is connected to the lower most portion of the slide valve or valve member 32. A float 39 is suitably supported on the stem 38 by means of a pin 40. The float may freely move up and down on the stem 38, it being limited in its downward movement by the pin 40 and in its upward movement by the lowermost end 43 of the slide valve 32. In the position shown, the stem 38 rests upon the bottom of the chamber 12 thus limiting the downward travel of the slide valve 32. Upward movement of the slide valve 32 is limited by means of an annular shoulder 41 which is adapted to engage the lower most ends of the sleeve 26.

In operation, the chamber 12 is under a vacuum or minus pressure since it is continually in communication with the vacuum conduit 27 by means of the bore 33. The conduit 29 is in communication with the atmosphere since in the position shown in Fig. 1, the passage 37 provides for communication between the atmosphere openings 31 and the nipple 28. The chamber 13 is therefore, in the position shown in Fig. 1, under atmosphere. In view of the pressure differential between chambers 12 and 13, the flap valve 23 is held tightly over the outlet 21 and thus the chamber 12 is sealed from the chamber 13. Milk now flows into the chamber 12 through the milk inlet tube 15. Milk collects within the chamber 12 and as the level rises, the float 39 also moves in an upward direction. As the float 39 moves upwardly it pushes against shoulder 43 of the slide valve 32. The slide valve 32 then moves upwardly until a land 42 on the slide valve 32 is pushed upwardly beyond the nipple 28 whereupon the transversely extending openings 36 are in communication with the nipple 28 by virtue of the registry of the passage 35 with said nipple 28. When the openings 36 are thus in communication with the nipple 28 and conduit 29, minus pressure existing within the bore 33 also provides for a vacuum or minus pressure within the chamber 13. Since the upper and lower chambers 12 and 13 respectively are now subjected to the same minus pressure the pressure between said chambers is equalized. Since a minus pressure exists within the chamber 13 the flap valve 20 is pressed inwardly against the seat 19 due to atmospheric pressure against the outward side of the flap valve. Milk entering into chamber 13 is thus retained therein. The pressure between chambers 12 and 13 being now equalized permits the milk within the chamber 12 to gravitate outwardly from the chamber through the outlet 21 into the discharge chamber 13.

As the liquid level in the chamber 12 recedes the float 39 also moves in a downward direction until it contacts the pin 40 whereupon the slide valve 32 gravitates or moves downwardly. The slide valve thereupon moves to the position shown in Fig. 1. The sliding movement of the float between the pin 40 and end 43 provides a sufficient delaying action on the slide valve to permit proper emptying of the chamber 12 before the valve is moved. It can be seen that in the position shown in Fig. 1, the chamber 13 again is under atmosphere pressure since the conduit 21 is in communication with the atmosphere through the passage 37 and the atmosphere openings 31. As this occurs, the valve 20 is opened and the milk which has been released to the discharge chamber 13 is discharged from the releaser. The cycle of operation thus again begins, the cycle continuing until all of the milk has been discharged from the system.

It can thus be seen that a positive and effective releasing action is obtained since the pressure equalization of the two chambers is governed by a valve regulating means which is responsive to the liquid level within the receiving chamber. Thus whenever the liquid level within the receiving chamber rises to a certain height, release of the milk is obtained.

Applicant has thus achieved the novel objects of his invention wherein an effective and positive milk releaser is provided.

It must be understood that changes may be made in the invention wtihout departing from the spirit of the invention as disclosed nor from the scope thereof as defined in the appended claims.

I claim:

1. A milk releaser comprising a container having an upper chamber and a lower chamber, a milk inlet connection on said upper chamber, said upper chamber having a milk outlet opening in a lower portion thereof, a flap valve hingedly connected over said outlet opening, said flap valve being positioned in said lower chamber and adapted to close the milk outlet during a pressure differential between the upper and lower chambers, a milk outlet connection on said lower chamber, a valve structure for said upper chamber, said structure including a tubular valve member having an open end adapted to connect to a source of vacuum, said valve member having openings in communication with the atmosphere, a vacuum connection communicating with the interior of the valve member, said vacuum connection including a conduit in communication with the lower chamber, a slide valve movable within said tubular valve member, said slide valve having a longitudinally extending bore communicating with the upper chamber and the open end of the valve member to provide for minus pressure within the upper chamber, passage means on said slide valve movable with said slide valve to connect said atmosphere openings with said vacuum connection during one position of said slide valve, whereby the upper chamber is subjected to minus pressure and the lower chamber is subjected to atmosphere, a laterally extending bore in said slide valve communicating with said longitudinal bore, said laterally extending bore being movable into communication with said vacuum connection during a second position of said slide valve, and means for moving said slide valve to the second position including a float connected to the slide valve below the point of communication of said laterally extending bore with said upper chamber, said float being responsive to the rise of the liquid in said upper chamber to move said slide valve whereby the pressure between the upper and lower chambers is equalized and the liquid gravitates through the outlet to said lower chamber.

2. A milk releaser comprising a container having an upper chamber and a lower chamber, a milk inlet connection on said upper chamber, said upper chamber having a milk outlet opening, a valve hingedly connected over said outlet opening, said valve being movable to close the milk outlet during a pressure differential between the upper and lower chambers, a milk outlet connection on said lower chamber, a valve structure for said upper chamber, said structure including a tubular valve member having an open end arranged to connect to a source of vacuum, said valve member having openings in communication with the atmosphere, a vacuum connection communicating with the interior of the valve member, said vacuum connection including a conduit in communication with the lower chamber, a slide valve movable within said tubular valve member, said slide valve having a longitudinally extending bore communicating with the upper chamber and the open end of the valve member to provide for minus pressure within the upper chamber, passage means on said slide valve movable to connect said atmosphere openings with said vacuum connection during one position of said slide valve whereby the upper chamber is subjected to minus pressure and the lower chamber is subjected to atmosphere, a laterally extending bore on said slide valve in communication with said longitudinal bore and arranged to communicate with said vacuum connection during a second position of said slide valve, and means for moving said slide valve to the second position including a float connected to the slide valve below the point of communication of said bore with said upper chamber, said float being responsive to the rise of liquid in said upper chamber to move said slide valve whereby the pressure between the upper and lower chambers is equalized and the liquid gravitates through the outlet to said lower chamber.

3. A milk releaser comprising a container having an upper chamber and a lower chamber, a milk inlet connection in communication with said upper chamber, said upper chamber having a milk outlet arranged to communicate with said lower chamber, an outlet valve normally seated over said outlet and being arranged to seal the opening during a pressure differential between the upper and the lower chambers, a valve structure connected to said container, said valve structure including an upright valve sleeve open at opposite ends, one of said ends being in communication with a source of vacuum, a slide valve positioned for reciprocation within said sleeve, said slide valve including a longitudinally extending bore in communication with the open vacuum end of said sleeve, said bore having a lower portion thereof in continual communication with said upper chamber to provide a minus pressure within said chamber, a conduit connected to said lower chamber and to said sleeve, said conduit providing for communication between the lower chamber and the interior of said sleeve, said sleeve having an opening in communication with the atmosphere, a passage formed by the sleeve and said slide valve, the passage being movable longitudinally with the slide to a first position to connect the conduit and the atmosphere opening, said slide valve having a laterally extending vacuum opening communicating with the longitudinal bore, said vacuum opening being movable with the slide valve to a second position to communicate with the conduit to provide a substantially equal minus pressure in said upper and said lower chambers, means for moving the slide valve and the laterally extending vacuum opening into communication with said conduit including a float connected to the slide valve, said float being movable in response to the rise and fall of liquid within the upper chamber for reciprocating said slide valve.

4. A milk releaser comprising an upper chamber and a lower chamber, a milk inlet connection in communication with said upper chamber, said upper chamber having a milk outlet in communication with said lower chamber, an outlet valve normally seated over said outlet and arranged to seal the opening during a pressure differential between the upper and the lower chamber, a valve structure including an upright valve sleeve open at opposite ends, one of said ends being in communication with a source of vacuum, a slide valve positioned for reciprocation within said sleeve, said slide valve including a longitudinally extending bore having a lower portion thereof in continual communication with said upper chamber to provide a minus pressure within said chamber, a conduit connected to said lower chamber and to said sleeve, said conduit providing for communication between the lower chamber and the interior of said sleeve, said sleeve having an opening in communication with the atmosphere, a passage formed by the sleeve and said slide valve, the passage being movable longitudinally with the slide to a first position to connect the conduit and the atmosphere opening, said slide valve having a vacuum opening communicating with the longitudinal bore, said vacuum opening being movable with the slide valve to a second position to communicate with the conduit to provide a substantially equal minus pressure in said upper and said lower chambers, means for moving the slide valve for connecting the vacuum opening with said conduit including a float connected to the slide valve, the float being movable in response to the rise and fall of liquid within the upper chamber for reciprocating said slide valve.

5. A milk releaser comprising a container having an upper chamber and a lower chamber, a milk inlet connection in communication with said upper chamber, said upper chamber having a milk outlet in communication with said lower chamber, a valve positioned to seal the milk outlet during a pressure differential between the upper and lower chambers, a valve structure on said container comprising a valve sleeve having an end portion adapted to connect to a source of vacuum, said sleeve having an atmosphere opening in communication with the atmosphere, a conduit connecting the interior of the sleeve with the lower chamber, a slide valve positioned for reciprocation within said sleeve, said slide valve having a bore in communication with the upper chamber and a source of vacuum whereby a pressure differential exists between said upper chamber and said lower chamber during a first position of said slide valve, a recessed portion on said slide valve, said recessed portion providing a passage movable with the slide valve to provide for communication between the atmosphere opening and the conduit during said first position, a vacuum opening in said slide valve and in communication with the bore, the opening being movable into communication with the conduit during a second position of said slide valve whereby the pressure between said upper and lower chamber is equalized and liquid in the upper chamber is discharged through the discharge outlet to the lower chamber, and float means responsive to the rise and fall of liquid within the upper chamber for moving said slide valve to the first and second positions.

HAROLD W. HEIN.

REFERENCES CITED

The following references are of record in the file of this patent:

UNITED STATES PATENTS

| Number | Name | Date |
| --- | --- | --- |
| 1,844,956 | Hapgood | Feb. 16, 1932 |
| 2,176,527 | Gascoigne et al. | Oct. 27, 1939 |